Sept. 1, 1953      T. H. PEIRCE      2,650,855

FLOOR MAT FOR AUTOMOTIVE VEHICLES

Filed June 11, 1948

INVENTOR.
Thomas H. Peirce.
BY
Harness, Dickey & Pierce.
ATTORNEYS.

Patented Sept. 1, 1953

2,650,855

UNITED STATES PATENT OFFICE 2,650,855

FLOOR MAT FOR AUTOMOTIVE VEHICLES

Thomas H. Peirce, Detroit, Mich., assignor to H. A. King, doing business as H. A. King Company, Detroit, Mich.

Application June 11, 1948, Serial No. 32,395

8 Claims. (Cl. 296—1)

This invention relates to floor mats for automotive vehicles or the like.

The formation of pools of water on the floor mats of automobiles is a rather common occurrence. This water may leak in during rain storms or be carried in as snow during the winter months. Regardless of the reason for its presence, water on the floor mats is a never failing source of annoyance particularly because it has, in the past, been a messy job to remove it.

It is the object of the present invention to overcome this annoyance by providing a means whereby water on the floor mats is automatically removed and the formation of pools is prevented.

Other objects and features of the invention will be apparent from the description of the accompanying drawings in which.

Figure 1:
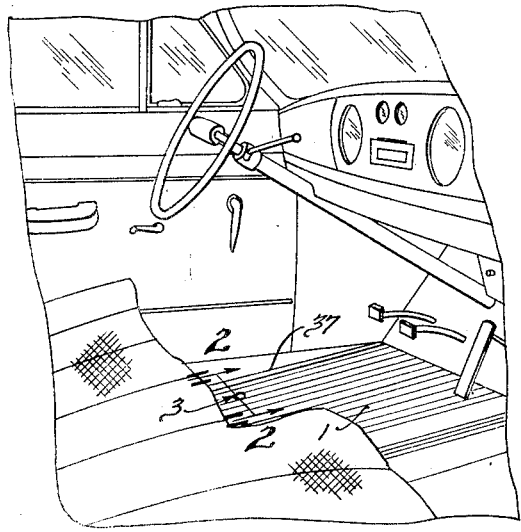
Figure 1 is a perspective view of a floor mat embodying the invention in place in an automobile.

In the drawings, I designates a floor mat of generally conventional design and construction and made, if desired, from material impervious to water. While a mat for the front of an automobile is shown, it will be understood that the invention is applicable to rear floor mats, or mats for other vehicles.

According to the invention at least one drain outlet 3 is provided in the floor mat at a point which is a low spot when the mat is laid on the floor board 5 of a vehicle and preferably which is adjacent a door of the vehicle.

The outlet 3 may be provided in a number of ways, the simplest of course, being a mere aperture in the mat coincident with an aperture 7 in the floor board. However, it is desirable to form the outlet 3 in a protuberance 9 which projects downwardly from the underside of the mat and through the aperture 7 in the floor board 5. Such a protuberance not only serves as a drain outlet but it also prevents water from leaking underneath the mat and performs the further important function of serving as a locating and anchoring pin for positioning and affixing the mat I on the floor board 5.

Figure 2:
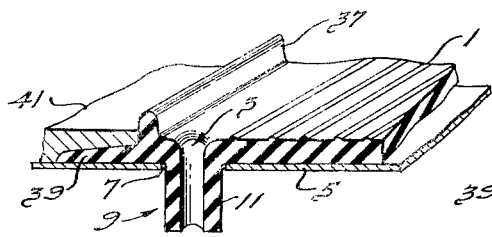
Fig. 2 is a section taken along the line 2—2 of Fig. 1 which is extended in perspective.

The said protuberance 9 may be provided in several different ways. Preferably, it is formed or molded integrally with the mat, as shown in Fig. 2 at 11, and extends down through the aperture 7 in the floor board 5.

Figure 3:
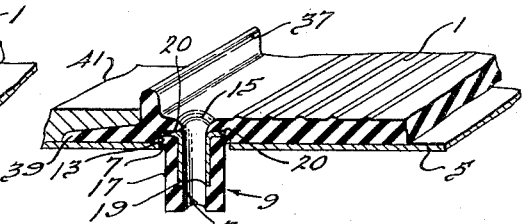
Figs. 3, 4 and 5 are sections similar to that of Fig. 2 showing modified forms of the invention.

As a modification (Fig. 3) the underside of the mat I may be provided with a counterbore 13 about a drain hole 15 and a flanged, resilient tube 17 fitted therein. If desired, a flanged metal strengthening insert 19 may be fitted in the bore of the tube 17 and a second counterbore 20 about the hole 15.

Figure 4:
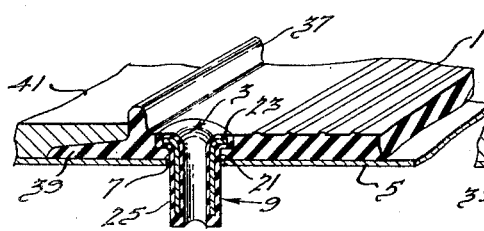

In a further modification (Fig. 4), the topside of the mat I is provided with a counterbored hole 21. The radial flange 23 of a flanged rubberlike drain tube 25 fits in the counterbore flush with the surface of the floor mat and the tube 25 extends downwardly through the coaxial holes 21 and 7 in the mat I and floor board 5, respectively, to provide the protuberance 9.

Figure 5:
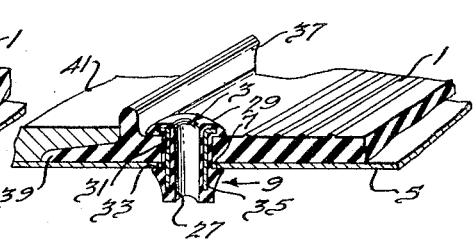

Another modification is shown in Fig. 5. Here there is a flanged rubberlike tube 27 with the flange 29 engaging the surface of the mat I about a hole 31 which is coincident with the hole 7 of the floor board 5. The other end of the tube 27 is preferably axially tapered away from the flange 29, for ease in assembly, which provides a radial shoulder 33 which engages the underside of the floor board 5. Thus, the mat I and floor board 5 are yieldably clamped together between the flange 29 and shoulder 33 of the tube 27. If desired the tube 27 may have an insert 35 of metal or the like, as in the other modifications, to strengthen it. If desired, the flange 29 may be seated in a counterbored hole as in the other modifications; however, with the arrangement as shown, home installation by the purchaser of a tube or plug 27 alone is facilitated since it is only necessary to provide the coincident holes 31 and 7 and no counterboring or enlarging of the hole is required. These considerations apply equally, of course, to the plugs 17 and 25 which can be very effective in removing water even if not installed in enlarged holes.

Preferably, the floor mat I is provided with an upstanding ridge 37 which may be molded or formed integrally therewith. The ridge 37 is located adjacent the drain outlet 3 and serves to collect and direct water thereto.

The mat I may also have a feathered edge 39 to fit under the sill mat 41 and thereby prevent flow of water underneath the mat around the edges thereof.

It will be understood that the foregoing description is not exhaustive or inclusive of all the modifications of the invention and that the invention is not to be limited to the details shown.

What is claimed is:

1. A floor mate for automotive vehicles or the like having a floor board with a drain hole therein comprising a sheet of flooring material having formed therein an integral tubular protuberance having a drain hole therethrough and projecting from the underside thereof and shaped to fit in said drain hole.

2. A floor mat for automotive vehicles or the like having a floor board with a drain hole therein comprising a sheet of flooring material having formed therein an integral tubular protuberance having a drain hole therethrough and projecting from the underside thereof and shaped to fit in said drain hole, and an upstanding ridge on the topside thereof adjacent the bore of the protuberance.

3. In an automobile or the like the combination of a floor board having an aperture therethrough and a floor mat having a tubular projection fitted in said aperture and an upstanding ridge adjacent said tubular projection, said tubular projection providing common means for permitting water to drain from the surface of the mat and for attaching the mat to a floor board.

4. The invention as set forth in claim 3 wherein the upper end of said tubular projection is integral with said floor mat.

5. The invention as set forth in claim 3, wherein one side of said mat is provided with a counterbored hole and said tubular projection is comprised of a tube of rubberlike material having a radial flange on the upper end thereof, and a metallic tubular insert fitted in said tube and having a radial flange, both said flanges being fitted in said counterbored hole.

6. The invention as set forth in claim 3 wherein said floor mat is provided with a hole counterbored on the underside of the mat and said tubular projection is comprised of a tube of rubberlike material having a radial flange on the upper end thereof, said flange being fitted in said counterbored hole.

7. The invention as set forth in claim 3 wherein said floor mat is provided with a hole counterbored on the upper side of the mat and said tubular projection is comprised of a tube of rubberlike material having a radial flange on the upper end thereof, said flange being fitted in said counterbored hole.

8. The invention as set forth in claim 3 wherein said mat is provided with a hole counterbored on the upper side of the mat and said tubular projection is comprised of a tube of rubberlike material having a radial flange on the upper end thereof and a radial shoulder spaced from said flange, said flange being fitted in said counterbored hole, said shoulder engaging the underside of said floor board.

THOMAS H. PEIRCE.

References Cited in the file of this patent

UNITED STATES PATENTS

| Number | Name | Date |
|---|---|---|
| 292,558 | Huse | Jan. 29, 1884 |
| 918,396 | Tracy | Apr. 13, 1909 |
| 1,193,250 | Foss | Aug. 1, 1916 |
| 1,413,265 | Dodge | Apr. 18, 1922 |
| 1,796,112 | McArthur, Jr. | Mar. 10, 1931 |
| 1,991,536 | Austin | Feb. 19, 1935 |
| 2,039,009 | Lampman et al. | Apr. 28, 1936 |
| 2,255,971 | Hall | Sept. 16, 1941 |
| 2,270,266 | Cavanagh | Jan. 20, 1942 |
| 2,421,803 | Robertson | June 10, 1947 |
| 2,442,204 | Janos | May 25, 1948 |

FOREIGN PATENTS

| Number | Country | Date |
|---|---|---|
| 375,591 | Great Britain | June 30, 1932 |